US008024060B2

(12) United States Patent
Alpay et al.

(10) Patent No.: US 8,024,060 B2
(45) Date of Patent: Sep. 20, 2011

(54) METHOD FOR DEFINING SAFE ZONES IN LASER MACHINING SYSTEMS

(75) Inventors: Mehmet E. Alpay, Portland, OR (US); Heny Sadikin, Portland, OR (US); David Childers, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 561 days.

(21) Appl. No.: 12/241,413

(22) Filed: Sep. 30, 2008

(65) Prior Publication Data
US 2009/0312858 A1 Dec. 17, 2009

Related U.S. Application Data

(60) Provisional application No. 61/061,748, filed on Jun. 16, 2008.

(51) Int. Cl.
G06F 19/00 (2011.01)
G06K 9/00 (2006.01)
(52) U.S. Cl. ........ 700/177; 382/152; 700/166; 700/182; 700/184; 700/185; 700/186
(58) Field of Classification Search .......... 700/177, 700/166, 182, 184–186, 245; 382/152
See application file for complete search history.

(56) References Cited

U.S. PATENT DOCUMENTS

| | | | | |
|---|---|---|---|---|
| 5,189,687 A * | 2/1993 | Bova et al. | ...................... | 378/65 |
| 5,589,936 A * | 12/1996 | Uchikawa et al. | ............ | 356/450 |
| 6,430,465 B2 * | 8/2002 | Cutler | ........................... | 700/193 |
| 6,870,949 B2 * | 3/2005 | Baldwin | ....................... | 382/145 |
| 7,055,112 B2 * | 5/2006 | Kuznicki et al. | .............. | 716/102 |
| 7,154,530 B2 * | 12/2006 | Andrews et al. | ................ | 348/86 |
| 7,180,922 B2 * | 2/2007 | de la Cal | .................... | 372/38.09 |
| 7,272,456 B2 * | 9/2007 | Farchmin et al. | .............. | 700/66 |
| 7,834,293 B2 * | 11/2010 | Wile et al. | ................ | 219/121.69 |
| 2003/0033041 A1 * | 2/2003 | Richey | ............................ | 700/98 |
| 2004/0008809 A1 * | 1/2004 | Webber | ............................ | 378/8 |

FOREIGN PATENT DOCUMENTS

| | | |
|---|---|---|
| JP | 2000-326416 A | 11/2000 |
| JP | 2001-142225 A | 5/2001 |
| JP | 2001-252782 A | 9/2001 |

OTHER PUBLICATIONS

Haferkamp et al., "Hand-Guided Laser Material Processing: Recent Devlopments and Safety Aspects", 1998, Proceedings of International Congress on the Applications of Lasers and Electro-Optics, Orlando, Fl., 8pg.*

(Continued)

*Primary Examiner* — Albert Decady
*Assistant Examiner* — Thomas Stevens
(74) *Attorney, Agent, or Firm* — Young Basile Hanlon & MacFarlane, P.C.

(57) ABSTRACT

A method for defining machine cutting path safety zones for use in laser machining devices. The method includes indentifying safety zone positional coordinates in a computer aided design model, using a machine vision system to image the modeled physical machining device, determining the positional difference between the design model safety zone points and the imaged points and converting the design model safety zone coordinates into machine specific coordinates for input into a machining cutting path program.

19 Claims, 3 Drawing Sheets

OTHER PUBLICATIONS

Kuivanen-R., "Experiences from the Use of an Intelligent Safety Sensor with Industrial Robots", 1988, Elsevier Science Publishers, Amsterdam, 7 pages.*

Wen et al., "Study on Edge Detection Based on Sampling in CNC Non-Contacct Measuring System", 2006, International Technology and Innovation Conference 2006, 5 pg.*

* cited by examiner

METHOD FOR DEFINING SAFE ZONES IN LASER MACHINING SYSTEMS

CROSS REFERENCE TO RELATED APPLICATIONS

This application claims priority to U.S. Provisional Patent Application No. 61/061,748, filed Jun. 16, 2008, the entire contents of which are incorporated herein by reference.

FIELD OF THE INVENTION

The present invention generally pertains to laser machining devices and to methods of set-up and operation of laser machining systems.

BACKGROUND

In material removal devices and processes, commonly referred to as material machining or simply machining, a cutting head, typically in the form of a carbide cutting wheel or bit, or in more advanced machining techniques, a laser head, is placed in contact or close proximity with the material to be machined. The cutting head is then moved along a path of travel across the material until the desired material is removed and/or altered from its original condition. In modern machining equipment, the cutting path and other parameters are programmed into a computer numerically controlled (CNC) machining device executing a computer program that, in one function, guides the cutting head along the desired path of travel.

In conventional and CNC machining devices, it is vital that the expensive and often delicate cutting heads, whether a cutting bit or a laser, not be subject to a path of travel that would contact portions of the material that are not to be machined or other surrounding equipment, for example, fixtures that may position and secure the material to be machined to a table or workstation. Any such unintended or unauthorized contact of the cutting head with these areas or equipment can damage or misalign the cutting head and/or the potentially delicate material that is to be machined.

In order to avoid unintended contact of the cutting head with surrounding equipment or portions of the material, safety zones are often established to prevent the cutting head from entering into certain areas where such undesirable contact of the cutting head may occur. Depending on the material to be machined, for example a planer or non-planar material surface, or where complex fixturing is used, these safety or restricted zones may take the form of two-dimensional x-y coordinate areas or may be three-dimensional zones having an x-y area as well as a z-coordinate height aspect.

Definition of these safe or restricted zones, where it is undesirable for the cutting head to travel or pass through, typically has to be defined on a job-by-job basis as either the material to be machined or the fixtures used to position or secure the object are different. In CNC machines, these coordinates, often three-dimensional, need to be identified in the coordinate system used by the cutting machine and then input into the computer program. Where many safety zones or safety zones with complex configurations are required, identification of the coordinates or boundaries of the safety zones, and input of these coordinates, can be very tedious and time consuming.

Therefore, it would be beneficial to develop a method for establishing safety or restricted zones in machining devices, for example laser machining devices, that is more efficient and takes less time than prior methods. It would be further advantageous to develop a method for identifying three dimensional coordinates defining the boundaries of desired restricted zones and importing them into the computer program, or programs, of computer numerically controlled machining devices.

SUMMARY

The present invention includes a method for defining safety or restricted zones in laser machining systems whereby once established, a laser cutting head will not enter or pass through the restricted zones.

In one aspect of the invention, a computer aided design (CAD) model using an arbitrary three-dimensional coordinate system is used to generically identify desired restricted zones where it is undesirable for a laser cutting head to pass into or through. A selected point or points in each restricted zone is identified on the CAD coordinate system. These selected points are used as alignment fiducial locations or points, which are included in an application file that is created. A machine vision subsystem of the laser machining system is used to convert or transform the alignment fiducial points from the CAD coordinate system into the specific laser machining coordinate system. The remainder of each desired restricted zone is then determined in the specific laser machining coordinate system by mapping or calculating the perimeter of the zone based on the prior CAD three-dimensional coordinate data in respect to the alignment fiducial points.

In one aspect of the invention, in the CAD model, simple geometric shapes or volumes are identified that may be combined to encompass or produce an envelope surrounding and/identifying a restriction zone. For odd- or complex-shaped restriction zones, several simple geometric shapes are combined with each other to form a more complex-shaped restriction zones.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
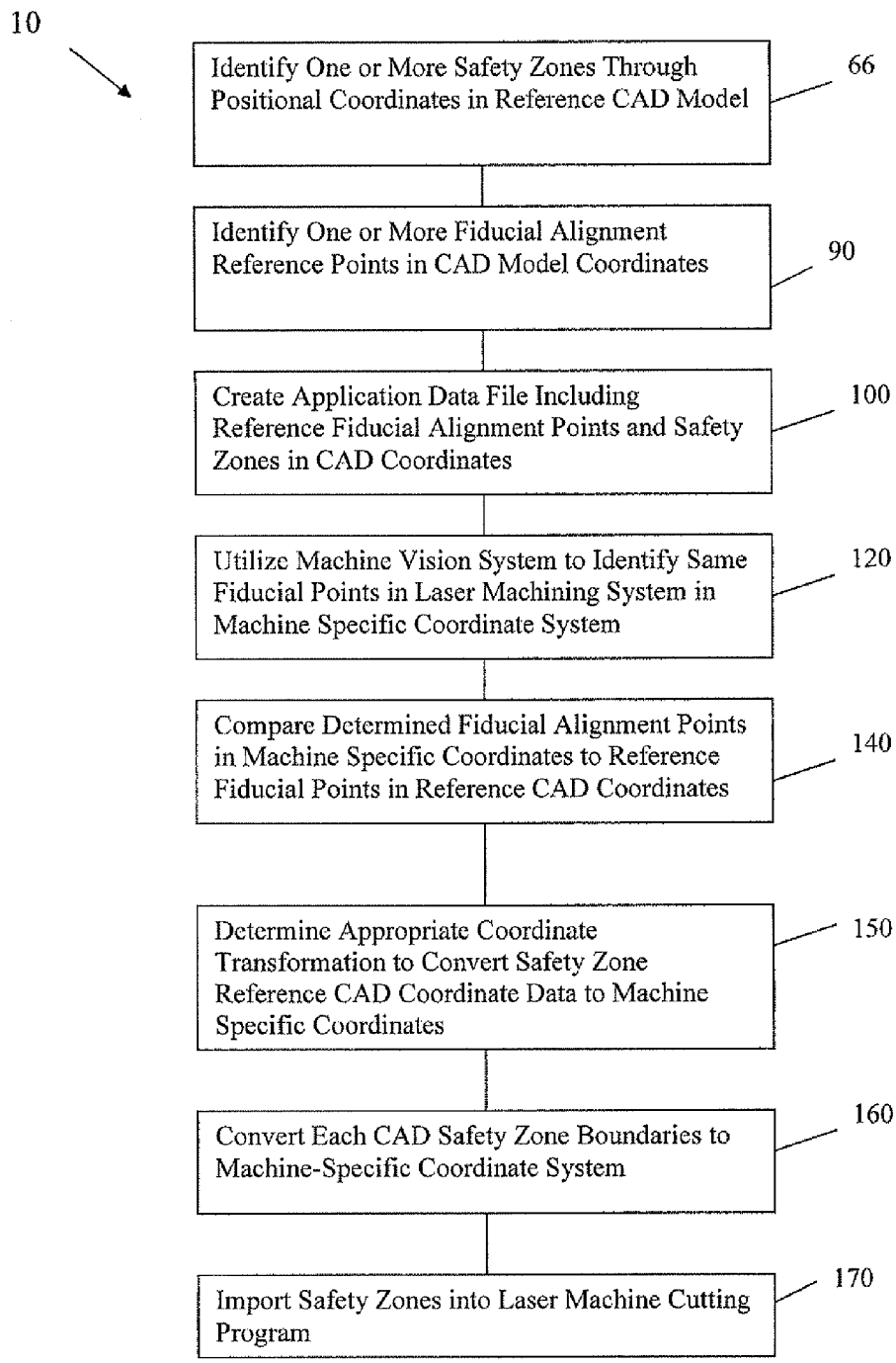
FIG. 1 is a flow chart illustrating preferred method steps of one example of the invention.

Referring to FIGS. 1-4, examples of a method for defining safety or restricted zones in an exemplary laser machining system are illustrated. Referring to FIG. 1, a schematic flow chart is shown identifying an example of the method steps 10 used to define restricted zones in an exemplary laser machining application.

Figure 2:
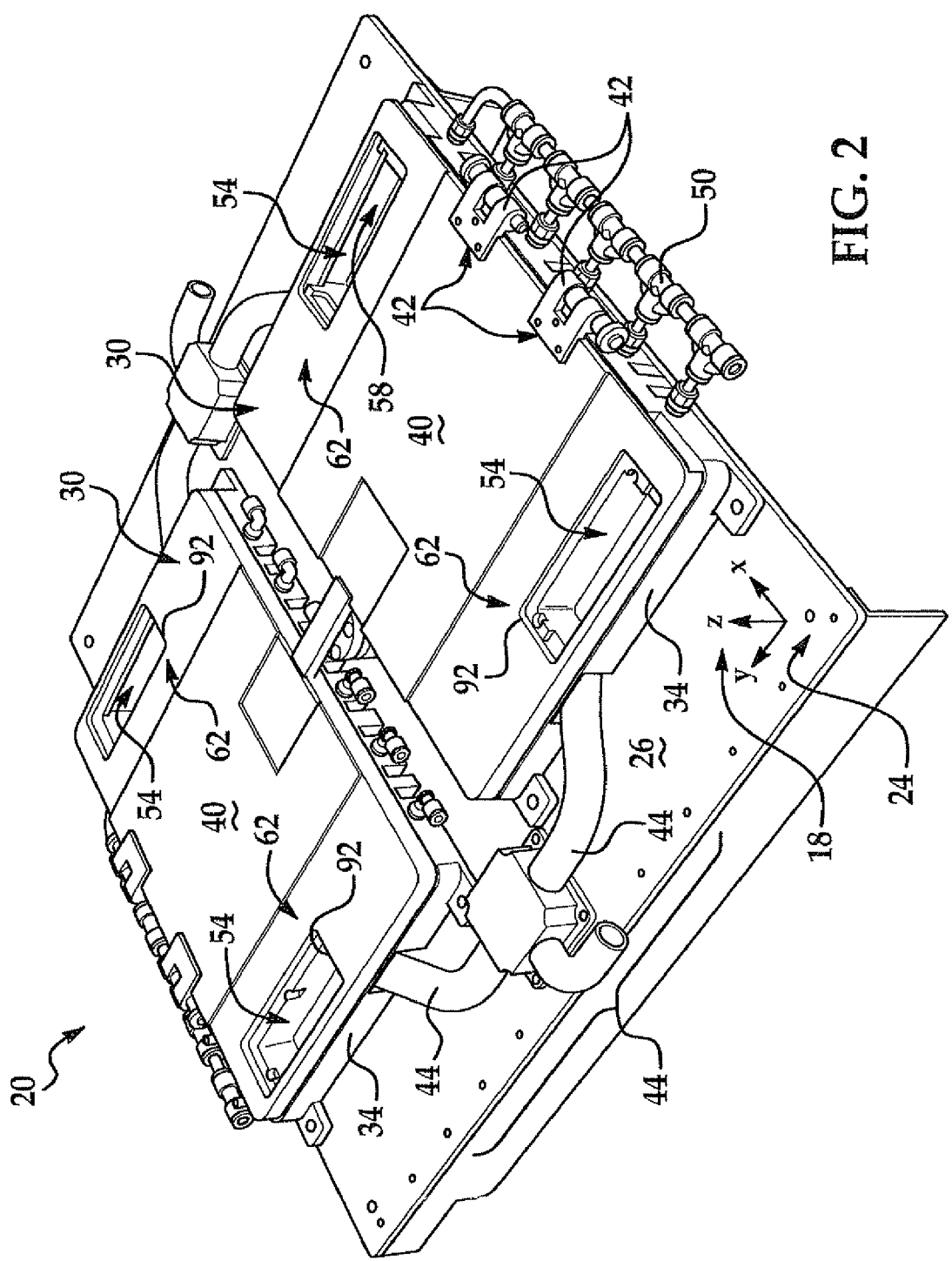
FIG. 2 is a schematic perspective view of an example of a laser machine part carrier including two fixtures each having two drill areas wherein one or more objects are positioned to be machined.
Figure 3:
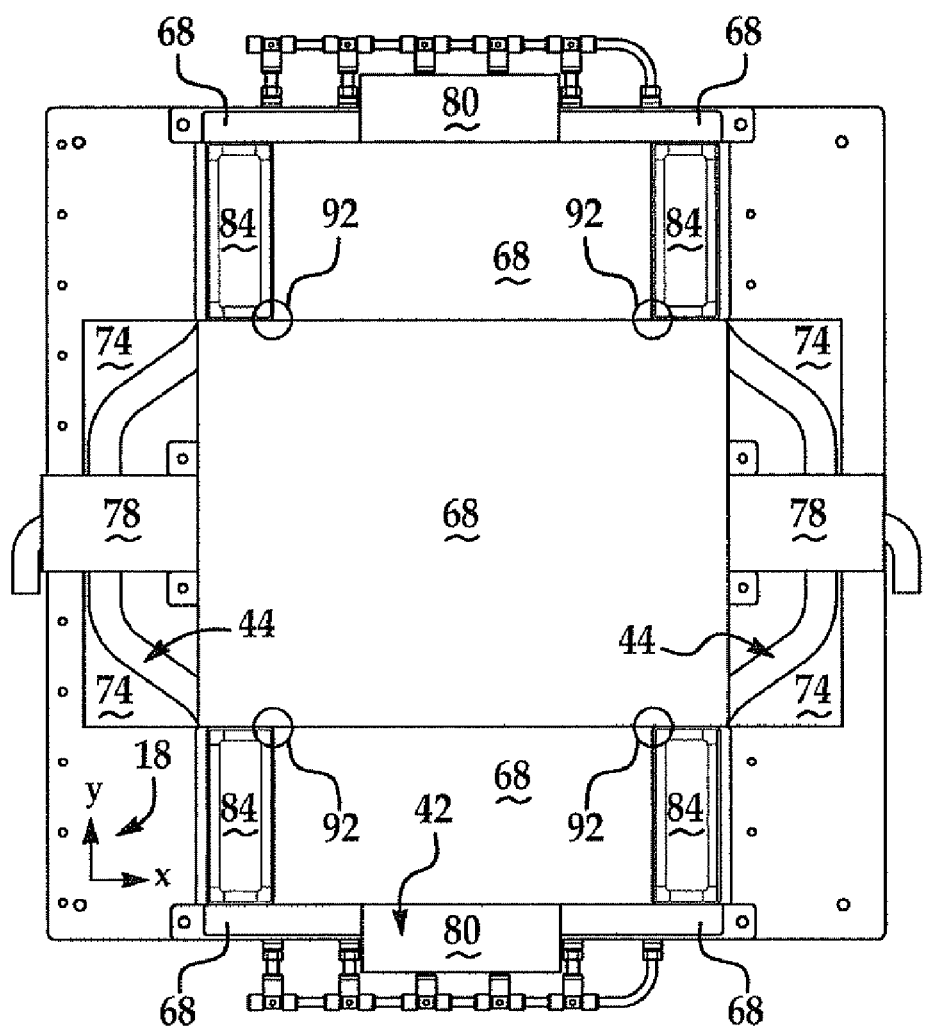
FIG. 3 is a schematic plan view of the example in FIG. 2 showing exemplary restriction zones and alignment fiducial points.

Referring to FIGS. 2 and 3, an example of a part carrier assembly for a laser machining system shown in a three-dimensional computer aided design (CAD) model is illustrated, and the descriptions hereafter pertain to the inventive method for defining restrictive zones on this exemplary laser machine system. It is understood that the inventive method for defining restricted zones may be used on other laser machining systems, and other material machining devices in general.

A part carrier of an exemplary laser machining device or system 20 is illustrated in FIG. 2. Other elements of the laser machining system 20 are omitted for clarity. The system 20 as shown includes a part carrier 24 that generally includes a planar support surface 26 generally defining an x-y coordinate plane as shown by coordinate system 18. Part carrier 24 may be a moveable surface or may be stationary and is not limited to a single planar surface as shown, but may include other surfaces or geometries to suit the particular machining application as known by those skilled in the art.

Machining system 20 may further include one or more part fixtures 30 (two shown) that assist in positioning and/or holding the particular part or object to be drilled or machined stationary with respect to part carrier 24. As shown in FIG. 2, each fixture 30 includes raised sidewalls 34 in the z-direction and a fixture lid 40 connected to the sidewalls by hinges 42. Each exemplary fixture 30 further includes vacuum lines 44 and cooling lines 50 as generally shown. Part carrier 24 and fixtures 30 may be manufactured from steel, aluminum or other materials suitable for the particular machining process as known by those skilled in the art.

The illustrated fixture lid 40 and sidewalls 34 define drilling or machining areas 54 (four shown) extending down through lid 40 in the z-direction toward the support surface 26 to a depth 58. Depth 58 may be the full height of the fixture sidewalls 34 or less than the height of the sidewalls 34. In an instance where depth 58 is less than the height of the sidewalls 34, an alternate part support surface (not shown) provided by the fixture 30 would be used to position and secure the part to be machined. As shown, fixtures 30 and four exemplary drilling areas 54 define four areas or islands 62 whereby the four drilling areas are generally located.

With the exemplary laser machining device 20 shown and described in FIG. 2, examples of the method for defining restricted or safety zones will be explained. In use of the terms restricted or safety zones, these zones, areas or three dimensional volumes are considered areas where it is undesirable for the laser machining head, and components and hardware connected thereto, to pass into or through as such passage could result in a collision of the laser head and other equipment, for example part carrier 24, fixture 30 or the object to be machined or drilled, resulting in damage to the laser head, fixture or object to be machined.

In a first step 66 of an inventive method 10 to define safety or restricted zones in the exemplary laser machining system 20, an existing three-dimensional CAD model in a CAD system 132 is used, or is generated, which includes or details the environment of the laser machining system including, for example, part carrier 24, fixture 30 and drill areas 54 of FIG. 2. In the CAD model, restricted or safety zones, areas or regions where the laser head is not to pass into or through are identified in the CAD three-dimensional coordinate system 18. For example, FIG. 3 shows laser system 20 of FIG. 2 including four restricted zones shown as rectangular areas 68, 74, 78 and 80. These four restricted zones, shown in FIG. 3 in two-dimensional space, may vary as to the top or height in the z-direction with respect to the part carrier support surface 26. A fifth zone 84 is not included as a restricted zone, but rather, represents the zone where it is desirable or permissible for the laser head to pass into as it surrounds the drill area 54 shown in FIGS. 2 and 4. Although the safety zones are described as zones or areas where the exemplary laser head is not to pass into or through, it is understood that these zones may be defined such that it is permissible for the laser head, or other machining head, to nonetheless pass above or partially through without causing, for example, a collision between the laser head and the equipment, fixtures or other components.

It is understood that these restricted zones 68, 74, 78 and 80 are defined in CAD by three-dimensional coordinate points (x, y and z). It is also understood that, although shown as rectangular areas, the restricted zones can take any geometric form such as polygons, cylinders or circles and other shapes known by those skilled in the art. It is also understood that when using the exemplary rectangles to define restricted zones in three-dimensional space, the volume or boundaries of the restricted zone may be derived by knowing the three-dimensional coordinates of opposing corners on the top and bottom of the box or rectangle, for example, the upper two left corners and the lower two right corners. From these points, the remaining corners, and the boundary of the restricted zone are easily calculated. Also, although described as a traditional CAD model, other forms of computer aided design systems may be used such as solid modeling programs and other design or engineering systems as known by those skilled in the art.

Once the restricted zones are generally identified and their boundaries are located in three-dimensional coordinate space according the resident CAD coordinate system 18, a method step 90 of identifying one or more fiducial alignment points 92 in the CAD coordinate system is used. In this step, one or more fiducial points, shown by points 92 in the CAD model in FIGS. 2 and 3, are identified and serve as alignment or reference points in the laser machine-specific coordinate system as described later. The fiducial alignment points 92 are preferably on the boundary of or are positioned within a particular restrictive zone, although they may be anywhere in the CAD model. In determining what feature of, for example, the part carrier 24, fixture 30 or drill area 54, will serve as an alignment point 92, it is considered whether such feature will be more readily detected or identifiable by the machine vision system used with the laser machining system 20 as explained later.

In the inventive method, the three-dimensional alignment point (or typically several points) 92 as well as the CAD coordinates for the identified restricted zones identified in the first step 66 are then loaded into a computer application file or program in a method step 100. Use of this data in the application file is further discussed below.

In the particular physical laser machining system or device 20 including the exemplary part support 24, fixture 30 and drill areas 54, there will typically be a different positional coordinate system (machine specific coordinate system) that will not directly match one-for-one the CAD coordinate system 18 described above. The laser machining system 20 will, however, include the CAD-modeled physical components of the part carrier 24, fixture 30, drill areas 54 and other associated components described above within reasonable tolerances known by those skilled in the art.

Advantageously, the inventive method is able to utilize the CAD information respecting the restrictive zones 68, 74, 78 and 80 in the machine specific coordinate system using the below described steps and processes.

Figure 4:
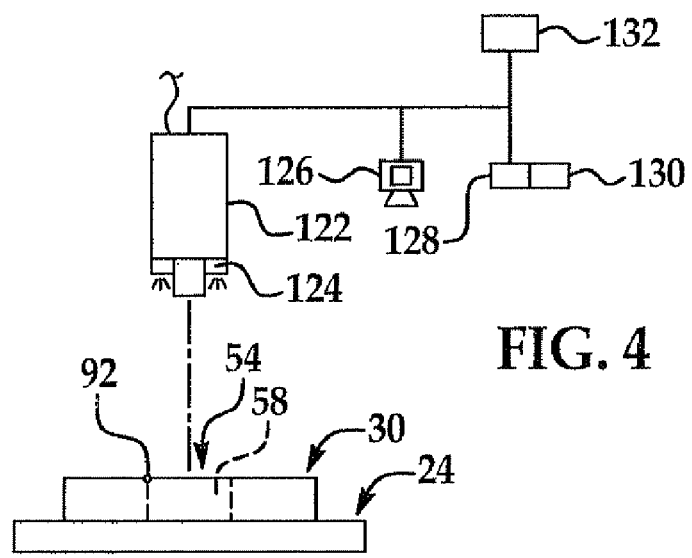
FIG. 4 is an example of a simplified schematic illustration of a machine vision system useable with the laser machining system to determine the restricted zones in laser machine specific coordinates.

As generally shown in FIGS. 1 and 4, in one example of the invention, a method step 120 uses a machine vision sub-system or group of components along with the laser machining system 20 components to first read or find the fiducial alignment points 92 on the physical components that were previously identified in the CAD model. In one example, one or more cameras 122 are used in combination with one or more light or illumination sources 124 to obtain images made up of pixels of the area or areas of the physical components, for example of the fixture 30, where the previously identified fiducial point or points 92 are estimated to be located. In one example, the camera(s) 122 are charge-coupled device-type cameras (CCDs) and the illumination source 124 is one or more rings of light emitting diodes (LEDs). Other forms of cameras and illumination sources to produce, for example, bright field or dark field illumination of an object, may be used as known by those skilled in the art. In addition to these components, the machine vision components may include the drivers and controllers (not shown) for the camera 122 and illumination sources 124, a display terminal 126 to view the images taken by camera 122, a microprocessor 128 and a data storage and/or software library 130 all in electronic communication with the above machine vision components and the CAD system 132.

Through one or more known image recognition techniques or algorithms, for example, normalized correlation, edge detection and blob analysis, the fiducial points on the physical laser machining components that match the fiducial points 92 in the CAD model are located and positively identified in three-dimensional space in the machine-specific coordinate system. In one example of determining the three dimensional location of a point or other marker on the physical components, the captured image is represented in pixels. Since the laser machining system knows where the camera is, it can readily be determined, for example, where the center of the captured image is. From this or other known image points, it can readily be calculated how many pixels away, in x-y coordinates, the desired point or fiducial alignment point is from the reference center point. Since the resolution of the camera is known, a user would know that, for example, each pixel is 2 microns (μm) wide. The distance from the exemplary reference point of the captured image to the fiducial alignment point can then be calculated in the laser machine coordinate system. This provides the precise location of the fiducial alignment point or points in the machine specific coordinate system. For explanation of one blob analysis technique, see U.S. Pat. No. 7,055,112 to Electro Scientific Industries, Inc., which is the same assignee of the present invention. For description of uses of different illumination sources see U.S. Pat. No. 6,870,949 also assigned to Electro Scientific Industries, Inc. Both patents are herein incorporated by reference in their entirety.

Upon identifying and determining the position of the fiducial alignment point or points in the physical laser machining system's machine specific coordinate system, the positions of the same fiducial points in both the CAD coordinate and machine coordinate systems are known, and a comparison step 140 is initiated through use of the application data file created in step 100 containing the CAD data. A calculation step 150 is then carried out to determine the coordinate transform that maps the CAD fiducial alignment point or points to the machine specific coordinate system. In one example of coordinate mapping, such a coordinate transform would comprise an affine function from the CAD coordinate system to the machine coordinate system. One example of a coordinate transform is:

$$X\_machine = a + b*x\_CAD + c*y\_CAD + d*x\_CAD*y\_CAD; \text{ and}$$

$$Y\_machine = e + f*x\_CAD + g*y\_CAD + h*x\_CAD*y\_CAD;$$

wherein x_CAD and y_CAD represent the x-y coordinate values from, for example, a fiducial reference point from the CAD coordinate system, and X_machine and Y_machine represent the x-y coordinates of the same fiducial in the machine specific coordinate system. The a-h coefficients represent the parameters describing the coordinate transform.

The coefficients associated with this exemplary transform would represent offset, rotation, scaling and keystone effects, and the standard least-squares method may be utilized to calculate the coefficients characterizing such a transform in such a way as to minimize the sum square of errors between the measured and mapped fiducial coordinates. It is understood that different coordinate or mapping transforms and alternative methods for calculating the parameters that characterize such transforms other than the example described may be used as known by those skilled in the art.

Once the appropriate mathematical conversion or coordinate transformation is determined, a method step 160 using the coordinate transform is applied on the above-described application data file that contains the remaining, or all of the, boundary points or coordinates for the restrictions zones previously determined in CAD. Using the predetermined coordinate transform, the other CAD points defining the restricted zone boundaries are converted or "mapped" to calculate or convert these CAD positional reference points into the laser machine-specific coordinate points.

Once converted or transformed as described above, the prior reference CAD data for the restrictive zones 68, 74, 78 and 80 is obtained in laser machine-specific coordinate system and is useable in that system to establish a cutting tool guide path, or in the alternative, identify areas that must lie outside of the machine tool path. A method step 170 to input the transformed laser machine-specific data into the laser machine cutting tool program or other computer program or subprograms can be performed. Then, this data can be used to check to make sure that the intended cutting path does not touch or enter into one of these zones, which could result in a collision and damage to the sensitive equipment or work piece to be machined.

The present method includes several advantages over prior methods. By using existing CAD data and transforming that data into machine specific data for use in defining safety or restrictive zones, the exemplary process eliminates the cumbersome and time consuming procedures of manually determining each safety zone boundary point and then implementing those points into the machine specific laser system. These advantages provide for much less system build time, the ability to utilize the same data file in CAD coordinate system to describe the safe and restricted zones across multiple systems whose machine coordinates do not necessarily match one another, and the advantage of easily changing between different restricted or safety zone topologies, for example, using a different part fixture for a different application, which improves ease-of-use and overall system productivity.

The above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:
1. A method of defining restricted safety zones for use in a material machining system, the method comprising:
  identifying positional coordinates of at least one safety zone in a computer aided design model of a physical material machining device;

identifying positional coordinates of at least one fiducial alignment reference point in the design model;

determining positional coordinates of the at least one fiducial reference point in the material machining device;

calculating a positional difference of the fiducial reference point between the design model and the material machining device; and converting the safety zone positional coordinates in the design model to the material machining device coordinates using the positional difference for use by the material machining system as a part of a machining path program.

2. The method of claim 1 wherein the at least one reference fiducial reference point is one of the safety zone positional coordinates.

3. The method of claim 1 wherein the step of determining the positional coordinates of the at least one fiducial reference point in the material machining device further comprises the step of taking a visual image of at least a portion of the material machining device including the at least one safety zone and the fiducial reference point as defined in the design model.

4. The method of claim 3 wherein the step of taking an image comprises selectively activating a camera and a lighting source positioned in proximity to the at least a portion of the material machining device including the at least one safety zone and the fiducial reference point.

5. The method of claim 4 wherein the step of calculating the positional difference of the fiducial reference point further comprises the step of determining a number of image pixels that separates the design model fiducial reference point location from the fiducial reference point location on the image.

6. The method of claim 1 wherein the step of calculating the positional difference of the fiducial reference point further comprises the step of defining a coordinate transform to convert the positional coordinates of the fiducial reference point location in the design model to the material machining device.

7. The method of claim 6 further comprising the step of determining transform coefficients wherein the transform coefficients are at least one of offset, rotation, scaling and keystone effects.

8. The method of claim 6 further comprising the step of determining an optimum coordinate transform to convert the positional coordinates of the fiducial reference point in the design model to the material machining device.

9. The method of claim 6 wherein the step of converting the safety zone positional coordinates further comprises the step of applying the coordinate transform to the safety zone positional coordinates.

10. The method of claim 1 further comprising the step of importing the material machining device coordinates of the at least one safety zone into a computer cutting path program for the material machining system.

11. A method of defining restricted safety zones for use in a material machining system, the method comprising:

generating a computer aided design model of a physical material machining device having geometric positional boundary locations of at least one safety zone;

identifying a positional location of at least one fiducial reference point in the design model;

generating a visual image of at least a portion of the physical material machining device including the at least one safety zone and the fiducial reference point as defined in the design model;

calculating a positional difference of the fiducial reference point between the design model and the visual image of the physical material machining device; and converting safety zone boundary coordinates in the design model to the geometric position boundary locations of the physical material machining device using the positional difference for use by the material machining system as a part of a cutting path program.

12. The method of claim 11 wherein the step of calculating the positional difference of the fiducial reference point further comprises the step of determining a number of image pixels that separates the fiducial reference point location as defined in the design model from the fiducial reference point location on the visual image.

13. The method of claim 12 further comprising the step of identifying an image reference point on the visual image spaced from the fiducial reference point on the visual image of the physical material machining device and determining a distance from the image reference point to the fiducial reference point on the visual image.

14. The method of claim 11 wherein the step of calculating the positional difference of the fiducial reference point further comprises the step of defining a coordinate transform to convert the positional location of the fiducial reference point in the design model to the physical material machining device.

15. The method of claim 14 wherein the step of converting the safety zone boundary coordinates further comprises the step of applying the coordinate transform to the safety zone boundary coordinates in the design model.

16. The method of claim 11 further comprising the step of generating an application data file for receipt of the safety zone boundary coordinates in the design model and the position location of the fiducial reference point.

17. The method of claim 11 further comprising the step of importing a safety zone defined by the geometric position boundary locations into the cutting path program for the material machining system.

18. The method of claim 11 wherein the at least one safety zone is a plurality of safety zones.

19. The method of claim 11 wherein the material machining system is a laser machining system.

* * * * *